US010659752B2

(12) United States Patent
Regensburger et al.

(10) Patent No.: US 10,659,752 B2
(45) Date of Patent: May 19, 2020

(54) SYSTEM FOR THE STEREOSCOPIC VISUALIZATION OF AN OBJECT REGION (71) Applicant: Carl Zeiss Meditec AG, Jena (DE)

(72) Inventors: Alois Regensburger, Erlangen (DE); Christoph Hauger, Aalen (DE)

(73) Assignee: CARL ZEISS MEDITEC AG, Jena (DE)

( * ) Notice: Subject to any disclaimer, the term of this patent is extended or adjusted under 35 U.S.C. 154(b) by 410 days.

(21) Appl. No.: 15/591,718

(22) Filed: May 10, 2017

(65) Prior Publication Data

US 2017/0332065 A1 Nov. 16, 2017

(30) Foreign Application Priority Data

May 11, 2016 (DE) .................. 10 2016 108 750

(51) Int. Cl.
*G02B 27/00* (2006.01)
*H04N 13/117* (2018.01)
(Continued)

(52) U.S. Cl.
CPC .......... *H04N 13/117* (2018.05); *G02B 21/22* (2013.01); *G02B 21/367* (2013.01);
(Continued)

(58) Field of Classification Search
CPC .. G02B 21/22; G02B 21/367; G02B 27/0093; H04N 13/368; H04N 13/378;
(Continued)

(56) References Cited

U.S. PATENT DOCUMENTS 6,288,689 B1 * 9/2001 Shikama .............. G02B 27/017
345/7
6,525,878 B1 2/2003 Takahashi
(Continued)

FOREIGN PATENT DOCUMENTS

DE 4212924 1/1993
DE 10203215 8/2003
(Continued)

OTHER PUBLICATIONS

German Office Action for 10 2016 108 750.5, dated Sep. 30, 2016.
Office Action dated Sep. 30, 2016 of the priority application No. 10 2016 108 750.5.

*Primary Examiner* — Nasser M Goodarzi
*Assistant Examiner* — Patrick A Ryan
(74) *Attorney, Agent, or Firm* — Nixon Peabody LLP; Jeffrey L. Costellia (57) ABSTRACT Presented herein are methods and systems for visualizing an object region. The system including an electronic image capturing device, comprising an optical assembly, which provides a first optical channel for a first imaging beam path imaging the object region on a first sensor area of the image capturing device and a second optical channel for a second imaging beam path imaging the object region on a second sensor area of the image capturing device and which contains a microscope main objective system, through which the first imaging beam path and the second imaging beam path pass, comprising a first image producing device for the visualization of the object region for a first observer, to whom a first image of the object region, captured on the first sensor area, and a second image of the object region, captured on the second sensor area, are suppliable, and comprising a second image producing device for visualizing the object region for a second observer.

14 Claims, 8 Drawing Sheets (51) Int. Cl.
*H04N 13/366* (2018.01)
*H04N 13/356* (2018.01)
*H04N 7/14* (2006.01)
*H04N 13/383* (2018.01)
*G02B 21/22* (2006.01)
*G02B 21/36* (2006.01)
*G06T 3/60* (2006.01)
*H04N 5/445* (2011.01)
*H04N 13/239* (2018.01)

(52) U.S. Cl.
CPC ....... *G02B 21/368* (2013.01); *G02B 27/0093* (2013.01); *G06T 3/60* (2013.01); *H04N 5/44504* (2013.01); *H04N 7/142* (2013.01); *H04N 13/239* (2018.05); *H04N 13/356* (2018.05); *H04N 13/366* (2018.05); *H04N 13/383* (2018.05)

(58) Field of Classification Search
CPC .. H04N 13/366; H04N 13/356; H04N 13/117; H04N 13/239; H04N 13/20–239; H04N 7/142; G06T 3/60
See application file for complete search history.

(56) References Cited

U.S. PATENT DOCUMENTS

| | | | | |
|---|---|---|---|---|
| 9,582,073 | B2* | 2/2017 | Sakuta | G06F 3/012 |
| 2004/0017607 | A1* | 1/2004 | Hauger | G02B 21/22 |
| | | | | 359/376 |
| 2010/0182418 | A1* | 7/2010 | Jess | G02B 21/0012 |
| | | | | 348/79 |
| 2011/0090305 | A1* | 4/2011 | Ikeda | G11B 20/00115 |
| | | | | 348/42 |
| 2012/0081394 | A1* | 4/2012 | Campbell | G06T 19/006 |
| | | | | 345/633 |
| 2015/0297311 | A1 | 10/2015 | Tesar | |
| 2016/0227190 | A1* | 8/2016 | Cole | G06F 3/012 |
| 2017/0020627 | A1* | 1/2017 | Tesar | A61B 90/20 |

FOREIGN PATENT DOCUMENTS

| | | |
|---|---|---|
| DE | 102010044502 | 3/2012 |
| DE | 102015216569 | 7/2016 |
| DE | 102015216648 | 11/2016 |

\* cited by examiner

SYSTEM FOR THE STEREOSCOPIC VISUALIZATION OF AN OBJECT REGION

PRIORITY

This application claims priority according to 35 U.S.C. § 119 to German patent application No. 10 2016 108 750.5, filed on May 11, 2016, the disclosure of which is incorporated herein by reference

SUMMARY

The invention relates to a system for visualizing an object region, comprising an electronic image capturing device, comprising an optical assembly, which provides a first optical channel for a first imaging beam path imaging the object region on a first sensor area or a plurality of first sensor areas of the image capturing device and a second optical channel for a second imaging beam path imaging the object region on a second sensor area or a plurality of second sensor areas of the image capturing device and which contains a microscope main objective system, through which the first imaging beam path and the second imaging beam path pass, comprising a first image producing device for the visualization of the object region for a first observer, to whom a first image of the object region, captured on the first sensor area or the plurality of first sensor areas, and a second image of the object region, captured on the second sensor area or the plurality of second sensor areas, are suppliable, and comprising a second image producing device for visualizing the object region for a second observer. Moreover, the invention relates to an object region visualizing method, wherein a first image of the object region and a second image of the object region are captured in a first optical channel comprising a first imaging beam path and in a second optical channel comprising a second imaging beam path comprising optical axes which form a stereo angle α in the object region, and wherein the object region is shown to a first observer and a second observer. Moreover, the invention relates to a computer program product for providing image data on a computer unit for visualizing an object region using such a method.

U.S. Pat. No. 6,525,878 B1 has disclosed such a system for the stereoscopic visualization of an object region. This system contains two mutually separate electronic image capturing devices, to which two stereoscopic partial beam paths, which pass through a common microscope main objective, are supplied in each case via beam splitters.

It is an object of the invention to provide a system and a method for visualizing an object region, in particular an operating region, by means of which the stereoscopic visualization of the object region with a multiplicity of different perspectives is facilitated.

This object is achieved by the system specified in claims 1 and 8 and by the object region visualizing method specified in claims 10 and 13. Advantageous embodiments of the invention are specified in the dependent claims.

In a system according to the invention for visualizing an object region, an image of the object region, which contains the at least one image section of the first image or of the second image, is suppliable to the second image producing device for the visualization of the object region.

A system according to the invention contains an orientation determining apparatus for determining the orientation of the perpendicular projection of the connecting line of the eyes of the second observer into the plane perpendicular to an optical axis of the microscope main objective system.

Within the scope of the invention, the orientation of the perpendicular projection of the connecting line of the eyes of the second observer may be determined, in particular, by virtue of the orientation of the perpendicular projection of the connecting line of the eyes of the second observer into the plane perpendicular to an optical axis of the microscope main objective system being carried out by referencing the orientation of the main body of the microscope unit to the image producing device by means of triangulation and image recognition by continuous evaluation of the signals of an image sensor. However, it is also possible within the scope of the invention for the orientation of the perpendicular projection of the connecting line of the eyes of the second observer into the plane perpendicular to an optical axis of the microscope main objective system to be determined from a relative position of the second observer, said position being related to the microscope main objective and, for example, being able to be entered manually at an input device.

A system according to the invention may contain a computing unit comprising a computer program having an image section ascertaining routine, in which the image section is ascertained from the captured first image of the object region or from the captured second image of the object region in accordance with the determined orientation of the perpendicular projection of the connecting line of the eyes of the second observer. In this way, it becomes possible to display the object region at the correct location and with a perspective corresponding to the natural vision for a main observer.

Here, it is advantageous if the computer program contains an evaluating routine for evaluating the orientation of the perpendicular projection of the connecting line of the eyes of the second observer into the plane perpendicular to an optical axis of the microscope main objective system, determined by means of the orientation determining apparatus, said evaluating routine supplying the captured first image and the captured second image to the second image producing device for the purposes of displaying a stereoscopic image of the object region if the orientation of the perpendicular projection of the connecting line of the eyes of the second observer into the plane perpendicular to an optical axis of the microscope main objective system, determined by means of the orientation determining apparatus, is parallel to the plane spanned by an optical axis of the first imaging beam path and by an optical axis of the second imaging beam path on the side of the microscope main objective system facing away from the object region or if it is at an angle φ in relation to this plane, the following applying to said angle: $-15°\leq\varphi\leq15°$ or $-10°\leq\varphi\leq10°$ or $-5°\leq\varphi\leq5°$.

In particular, the computer program may contain a routine for extrapolating the at least one image section of the first image or of the second image to an image which is suppliable to the second image producing device for visualizing the object region, said image having an image format adapted to an image display of the image producing apparatus. By way of example, to this end there is upscaling corresponding to the magnification factor and an interpolation of the image supplied to the image producing device to a new image resolution.

Moreover, the routine for extrapolating the at least one image section of the first image or of the second image in the system is able to convert the at least one image section into an image that is suppliable to the second image producing device for visualizing the object region, said image having image regions lying outside of the first image or outside of the second image.

A sensor area of an image sensor in a system according to the invention may have a rectangular form. In particular, a sensor area of an image sensor in such a system may be square. In the present case, a sensor area of an image sensor should be understood to mean the area of the image sensor which is sensitive for detecting light. By way of example, the sensor area of an image sensor embodied as a CCD sensor may be the area provided by the matrix of light-sensitive photodiodes for capturing light, or a portion of this area. It should be noted that the form of the sensor area of an image sensor may be set, in particular also by selecting the regions of an image sensor used for capturing light. By way of example, a portion of the area provided by the matrix of the light-sensitive photodiodes, by means of which the light from the object region is captured, may be a square area.

In the present case, a resolution of an image display is understood to mean a pixel resolution of the image display. The resolution of an image should likewise be understood as a pixel resolution, i.e. the number of pixels from which the image is composed.

A preferred embodiment of the invention provides for the spectral transmission of the first optical channel and the spectral transmission of the second optical channel for the light passing through the first optical channel and the light passing through the second optical channel to be different.

The system may contain an image superposition stage for superposing the first image and the second image to form a monoscopic superposition image of the object region. Here, the image superposition stage may have an operative connection to the first image producing device for supplying the monoscopic superposition image to the first image production device.

In particular, a system according to the invention may comprise an orientation determining apparatus for determining the orientation of the perpendicular projection of the connecting line of the eyes of the second observer into the plane perpendicular to an optical axis of the microscope main objective system and a computing unit comprising a computer program containing an image section ascertaining routine, in which the image section is ascertained from the monoscopic superposition image of the object region in accordance with the determined orientation of the perpendicular projection of the connecting line of the eyes of the second observer. Here, it is advantageous if the computer unit has an operative connection to the second image producing device for supplying the monoscopic superposition image to the second image producing device.

In a system according to the invention, a coupling device for coupling the movement of the at least one displaceable lens in the first optical system with the movement of the at least one displaceable lens in the second optical system and the movement of the at least one displaceable lens in the third optical system renders it possible to ensure that the imaging scale in the two other optical channels is the same when the imaging scale is varied in one optical channel.

Since digital display machines are typically rectangular and, in particular, often have a side ratio of 16:9, a rectangular display region is, according to the invention, selected from regions of interest on the sensor area of the image sensor, i.e. on the regions of the sensor area with information of interest, said display region then in fact being transferred to an observer as an image signal. The inventors have discovered that it is advantageous if the display region on the image sensor has the same pixel resolution, e.g. 3840×2160 pixels, and the same side ratio as the electronic display for the observer's eye. Therefore, according to the invention, it is proposed that a read region is subsequently matched to the display by digital zooming with image point interpolation and, optionally, by further cutting of the read region in the case where deviations exist between the pixel resolution of a display and of an image sensor. It should be noted that, in particular, the display region may enclose an image region as a circumference in order to display the entire image with dark edges in the display. However, it is also possible to design an image region as an inner circle in order thereby to avoid dark regions at the display edges.

In particular, it is advantageous if the electronic image capturing device has an image processing stage, connected to the data separating stage, for the digital rotation of the image data of an image data group, which is matched to the orientation of the perpendicular projection of the connecting line of the eyes of a main observer and/or of a co-observer into the plane perpendicular to the optical axis of the main objective system.

Here, in particular, provision may be made for the image processing stage to interpolate the brightness and/or the color of the image data of the first and/or second and/or third group of image data on the basis of a predetermined brightness and/or color information item for the image data.

The invention also extends to an object region visualizing method, wherein a first image of the object region and a second image of the object region are captured in a first optical channel comprising a first imaging beam path and in a second optical channel comprising a second imaging beam path comprising optical axes which form a stereo angle α in the object region, and wherein the object region is shown to a first observer and a second observer, wherein the first image and the second image are supplied to the first observer for the stereoscopic visualization of the object region, and wherein an image of the object region which contains at least an image section of the first image or of the second image is supplied to the second observer for the visualization of the object region.

Moreover, the invention also extends to an object region visualizing method, wherein a first image of the object region and a second image of the object region are captured in a first optical channel comprising a first imaging beam path and in a second optical channel comprising a second imaging beam path comprising optical axes which form a stereo angle α in the object region, and wherein the object region is shown to a first observer and a second observer, wherein the spectral transmission of the first optical channel and of the second optical channel for the light passing through the first optical channel and the light passing through the second optical channel are different, wherein a superposed image in the form of a superposition of the first image and of the second image is supplied to the first observer for visualizing the object region, and wherein an image section of the superposed image which has an image edge parallel to the perpendicular projection of the connecting line of the eyes of the second observer into the object region is displayed to the second observer for visualizing the object region.

Moreover, the invention extends to computer program product for carrying out, by means of a computer, an object region visualizing method specified above, the first image of the object region and the second image of the object region being supplied to said computer.

Below, the invention will be explained in more detail on the basis of the exemplary embodiments depicted schematically in the drawing.

The present disclosure is susceptible to various modifications and alternative forms, and some representative embodiments have been shown by way of example in the drawings and will be described in detail herein. It should be understood, however, that the inventive aspects are not limited to the particular forms illustrated in the drawings. Rather, the disclosure is to cover all modifications, equivalents, and alternatives falling within the spirit and scope of the disclosure as defined by the appended claims.

DETAILED DESCRIPTION OF ILLUSTRATED EXAMPLES

Figure 1:
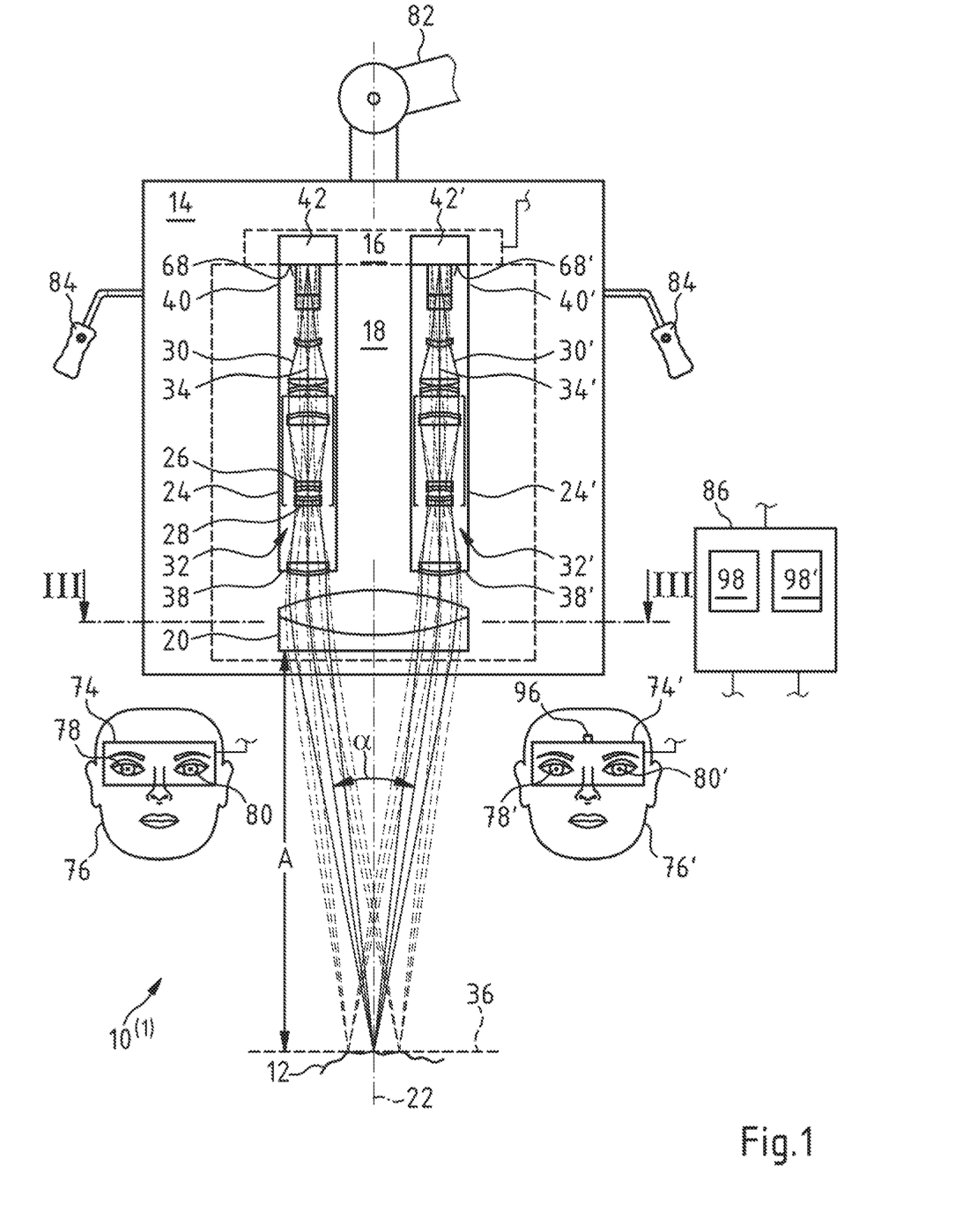
FIG. 1 shows a first system for visualizing an object region with a first image producing device for a first observer and with a second image producing device for a second observer.

The first system $10^{(1)}$, shown in FIG. 1, for visualizing an object region 12 comprises a microscope unit 14 containing an electronic image capturing device 16 and comprises an adjustable optical assembly 18. The optical assembly 18 comprises a microscope main objective system 20 with an optical axis 22 and a first optical system 24 and a second optical system 24'.

In each one of the optical systems 24, 24' there is a first lens element 26 and a second lens element 28, which are embodied as cemented members and which may be displaced in a direction parallel to the optical axis 22 of the microscope main objective system 20. In the microscope unit 14, the first monoscopic imaging beam path 30 passes through the first optical system 24 in each case. The second monoscopic imaging beam path 30' extends through the second optical system 24' in the microscope unit 14.

The first optical system 24 provides a first optical channel 32 for a first monoscopic imaging beam path 30, the latter imaging the object region 12 on first sensor areas of the image capturing device 16. Accordingly, the second optical system 24' defines a second optical channel 32' for a second monoscopic imaging beam path 30' which images the object region 12 on second sensor areas of the image capturing device 16.

Together, the first and second monoscopic imaging beam paths 30, 30' form a stereoscopic imaging beam path which facilitates a stereoscopic visualization of the object region 12. The imaging beam paths 30, 30' have optical axes 34, 34', which are parallel to one another on the side of the microscope main objective system 20 facing away from the object region 12 and which form the stereo angle α in the object plane 36 in the object region 12.

The two optical systems 24, 24' have an identical setup. Each optical system 24, 24' contains a prism color splitter 40, 40' as an optical element through which the corresponding monoscopic imaging beam path 30, 30' passes. The optical elements of the optical systems 24, 24' are received in a holder 38, 38' in each case.

Figure 2:
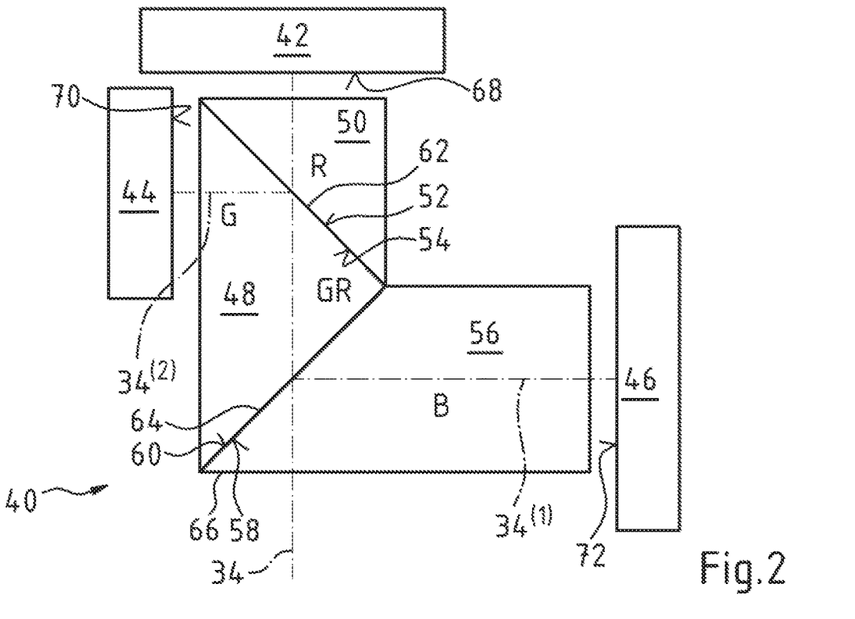
FIG. 2 shows a prism color splitter with image sensors in the system.

FIG. 2 shows the prism color splitter 40 with image sensors 42, 44, and 46 of the image capturing device 16. The prism color splitter 40 contains a first isosceles right-angled prism 48 and a right-angled prism 50 with a base area 52 connected to the lateral area 54 of the isosceles right-angled prism 48.

The prism color splitter 40 has a prism cuboid 56 with a lateral area 58, which rests against the lateral area 60 of the isosceles right-angled prism 48.

A dielectric interference filter 62, 64 is respectively arranged on the lateral area 54 and on the lateral area 60 of the isosceles right-angled prism 48. The dielectric interference filter 64 mirrors the blue light component of the first monoscopic imaging beam path 30, which is incident on the base area 66 of the prism cuboid 56 along the optical axis 34, into a beam path with the optical axis $34^{(1)}$ in the direction perpendicular to the optical axis 34. The green component and the red component of the light in the imaging beam path 30 reach through the interference filter 64 along the direction of the optical axis 34, into the isosceles right-angled prism 48. The interference filter 62 divides the light into a beam path with a red light component passing through the right-angled prism 50 in the direction of the optical axis 34 and into a beam path with the optical axis $34^{(2)}$, the direction of which is perpendicular to the direction of the optical axis 34.

The image sensors 42, 44, 46 have first sensor areas 68, 70, 72, on which the adjustable optical assembly 18 in each case produces a first image of the object region 12.

The prism color splitter 40' of the second optical system 24' has an identical setup to the prism color splitter 40 of the first optical system 24. The prism color splitter 40' guides the monoscopic imaging beam path 30' to image sensors with second sensor areas corresponding to the first sensor areas 68, 70, 72 of the image sensors 42, 44, 46. There, the monoscopic imaging beam path 30' in each case produces a second image of the object region 12.

FIG. 1 shows the image sensor 42 with a first sensor area 68 and the image sensor 42' with a second sensor area 68'.

The system $10^{(1)}$ for visualizing an object region 12 includes a first image producing device 74 serving to display an image of the object region 12 for a first observer 76. Moreover, the system 10 has a second image producing device 74', by means of which a further image of the object region 12 may be shown to a second observer 76'. The first image producing device 74 and the second image producing device 74' are each embodied as a so-called head mounted display (HMD), which facilitates displaying both monoscopic images and stereoscopic images for the eyes 78, 80 and 78', 80' of the first observer 76 and the second observer 76' by means of displays.

The microscope unit 14 with the image capturing device 16 and the optical assembly 18 is received on a stand 82. This stand 82 contains mechanisms for compensating load torques by way of motor-driven drives and/or compensating weights (not shown here), which allow the first observer 76 to set the observation direction of the microscope unit 14 largely without force. To this end, the microscope unit 14 comprises handles 84. By moving the microscope unit 14 by means of the handles 84, the first observer 76 may set e.g. the distance A between the microscope main objective system 20 and the object region 12, and the orientation of the optical axis 22 of the microscope main objective system 20 relative to the object region 12.

The system $10^{(1)}$ contains a computer 86, which is connected to the image capturing device 16. The computer 86 contains a computing unit 98, which combines the first image 88 of the object region 12 captured at the first sensor areas 68, 70, 72 and the image 90 of the object region 12 captured at the second sensor areas, such as e.g. the image of the object region captured at the second sensor area 68', to form a stereoscopic image which may be displayed to the first observer 76 by means of the first image producing device 74.

Figure 3:
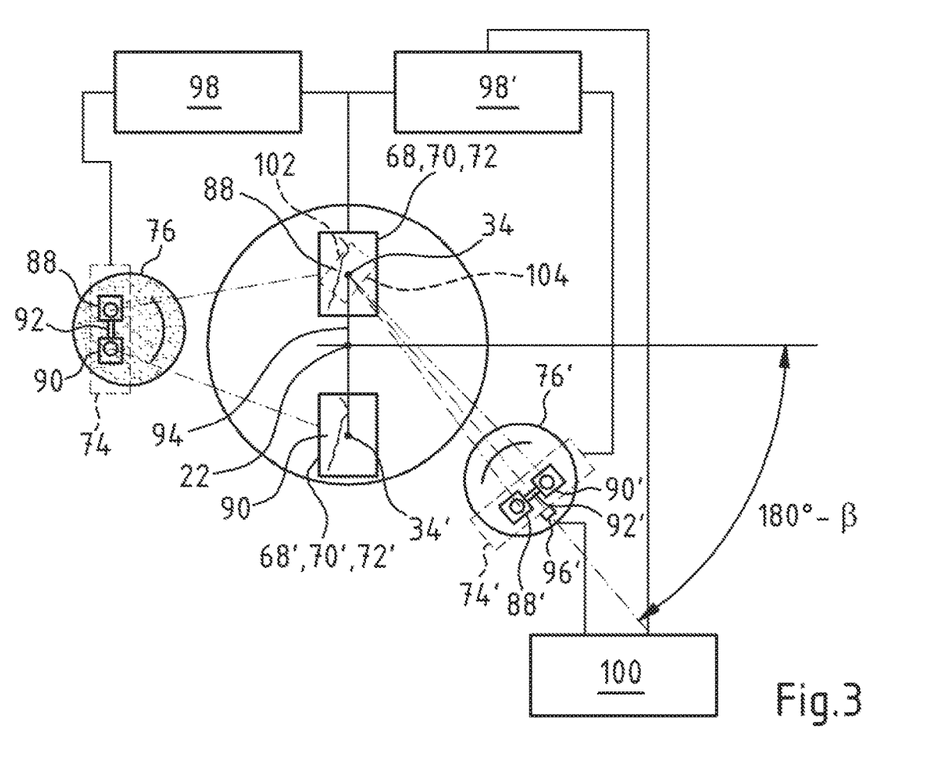
FIG. 3 shows a projection of the sensor areas of image sensors in the system along the line III-III from FIG. 1.

FIG. 3 shows a partial section of the system along the line III-III from FIG. 1 with a projection of the sensor areas 68, 70, 72 of the image sensor 42, 44, 46 and the sensor areas 68', 70', 72' of the image sensor 42', 44', 46' into the plane of the microscope main objective system 20.

The sensor area 68 of the image sensor 42 and the sensor area 68' of the image sensor 42' each have a rectangular form with a side ratio of 16:9. It should be noted that, in principle, the sensor areas 68, 68' of the image sensors 42, 42' may have any side ratio, e.g. also the side ratio of 4:3 or else 1:1. The computing unit 98 reads the first and second image sensors of the image capturing device 16 and supplies the read image data to the image producing device 74. Using this, the first observer 76 is shown the image 88 of the object region 12 captured by means of the first image sensors in the image capturing device 16 and the image 90 of the object region 12 captured by means of the second image sensors in the image capturing device 16 as a stereoscopic image in a stereo image mode, said stereoscopic image being formed by the image 88 as a first stereoscopic partial image and by the image 90 as a second stereoscopic partial image.

By adjusting the microscope unit 14 at the handles 84, the observer 76 may ensure that, in the system $10^{(1)}$, the orientation of the perpendicular projection of the imaginary connecting line 92 of their eyes 78, 80 into the plane perpendicular to an optical axis 22 of the microscope main objective system 20 is parallel to the distance line 94 of the optical axes 34, 34' of the first monoscopic imaging beam path 30 and of the second monoscopic imaging beam path 30'. Then, a stereoscopic image of the object region 12 is visualized for the first observer 76, said image corresponding to natural visual impression.

The second image producing device 74' contains an orientation determining apparatus 96, embodied as a continuously measuring system, for determining the orientation of the perpendicular projection of the connecting line 92' of the eyes 78', 80' of the second observer 76' into the plane perpendicular to an optical axis 22 of the microscope main objective system 20 by referencing the orientation of the main body of the microscope unit 14 in relation to the image producing device 74' by means of triangulation and image recognition by evaluating the signals of an image sensor (not shown here), which is integrated into the orientation determining apparatus 96.

The computer 86 in the system $10^{(1)}$, shown in FIG. 1, has a further computing unit 98'. The further computing unit 98' serves to read the first image sensors 42, 44, and 46 or the second image sensors 42', 44', and 46' in the image capturing device 16. The orientation determining apparatus 96 transmits the captured orientation to an orientation calculating stage 100 in the computer 86. The orientation calculating stage 100 provides an orientation information item for the computing unit 98', by means of which the computing unit 98' produces image data from the image signals of the image sensors 42, 44, 46 and/or the image sensors 42', 44', 46', said image data corresponding to a monoscopic rectangular image 102 of the object region 12, which has a base side 104 parallel to the orientation, determined by means of the orientation determining apparatus 96, of the perpendicular projection of the connecting line 92' of the eyes 78', 80' of the second observer 76' into the plane perpendicular to an optical axis 22 of the microscope main objective system 20.

Figure 4A:
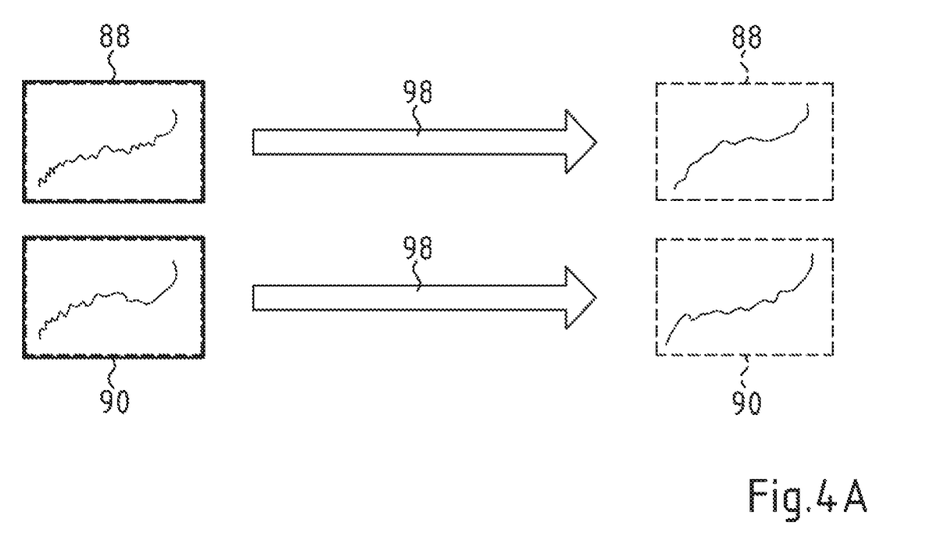
FIG. 4A and FIG. 4B show capturing and processing of image data in the first system for visualizing the object region with the first image producing device and with the second image producing device.
Figure 4B:
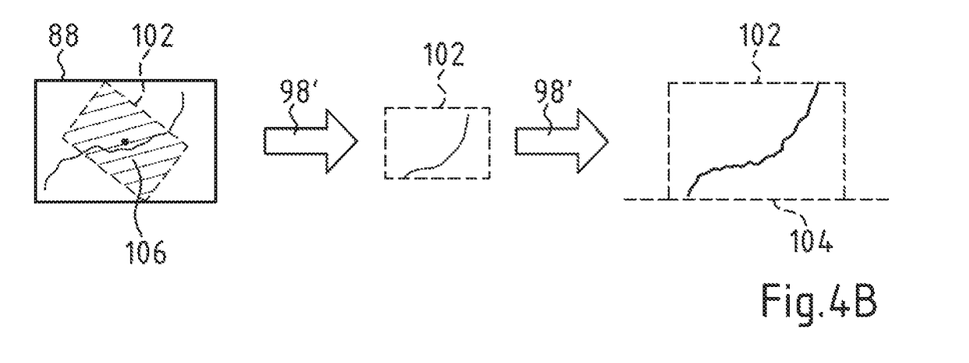

FIG. 4A and FIG. 4B show capturing and processing of image data in the system $10^{(1)}$ for visualizing the object region 12 with the first image producing device 74 and with the second image producing device 74', which are shown in FIG. 3.

The image data of the image 88 captured by means of the image capturing device 16 or of the image 90 captured by means of the image capturing device 16 are displayed in the system $10^{(1)}$ for the left and right eyes 78', 80' of a second observer 76' as a monoscopic image 102 of the object region 12, which image was digitally windowed and rotated in relation to a partial image 88, 90.

In the system $10^{(1)}$, the second observer 76' has the option of determining which of the two optical channels 32, 32' is used to visualize the object region 12 by means of the image producing device 74'. In this way, the system $10^{(1)}$ facilitates a visualization of the object region 12 which is optimized for the second observer 76'. By way of example, it is possible to show the second observer 76' an image 102 of the object region 12 captured by that imaging beam path 30, 30' whose optical axis 34, 34' projects into an operating channel. Moreover, it is possible to show the second observer 76' an image 12 of the object region 12 captured by that imaging beam path 30, 30' which is not shadowed by operating instruments.

A modified embodiment of the system $10^{(1)}$ provides for a switchover between the optical channels 32, 32', by means of which the second observer 76' is shown the image of the object region 12, to be carried out automatically depending on the co-observer viewing angle or depending on an ascertained image brightness on the first and second sensor areas of the image sensors.

In order to avoid irritations of the second observer 76', it is advantageous if a period of time, which is at least 5 minutes or preferably at least 10 minutes, lies between the automatic switchover from the first optical channel 32 to the other optical channel 32' of the image shown to the second observer 76' or if this switchover is only carried out in the case of a change in position of the second observer 76'.

The stereoscopic partial images 88, 90 of the object region 12 captured by means of the image capturing device 16 are supplied to the first observer 76 by way of the computing unit 98 of the computer 86 shown in FIG. 1. Here, the computing unit 98 can show the first observer 76 the entire image information supplied to the first and second sensor areas of the image sensors in the first imaging beam path 30 and in the second imaging beam path 30'.

It should be noted that provision may be made in a modified embodiment of the system 10$^{(1)}$ for the image of the object region 12 shown to the first observer 76 to be able to be digitally zoomed by means of the computing unit 98 or for, as an alternative thereto, the first observer 76 to be shown a digitally windowed and/or an interpolated image of the object region. By way of example, this is advantageous if the resolution of the image display or the format of the image display of the image producing device 74 deviates from the resolution of the format for capturing image data of the image capturing device 16.

In order to display a non-reversed image of the object region 12 for the second observer 76', an image 102 as a digitally windowed and rotated partial image is extracted from the image 88 captured by means of the image capturing device 16 in the imaging beam path 30. The fact that only a reduced field-of-view can be used for displaying this non-reversed image of the object region and that the image 102, as a digitally windowed and rotated partial image of the image 88, has a reduced resolution in relation to the image 88 are accepted.

Then, the image 102 is adapted to the resolution of a display in the display of the image producing device 74' by digital zooming/interpolation in the computing unit 98'.

The image 102 is preferably arranged centrally in the image 88, which is a stereoscopic partial image. Here, the orientation of the image 102 corresponds to the orientation of the perpendicular projection of the connecting line 92' of the eyes 78', 80' of the second observer 76' into the plane of the microscope main objective system 20.

It should be noted that, in a modified embodiment of the system 10$^{(1)}$, provision may be made for the orientation determining apparatus 96 not to be embodied as a continuously measuring system but instead for it to contain an input device (not shown here) for the manual entry of the position of the second observer 76', it being possible to enter the position in relation to the microscope unit 14 or the position of the first observer 76 into said input device. Here, the orientation determining apparatus 96 ascertains the orientation of the perpendicular projection of the connecting line 92' of the eyes 78', 80' of the second observer 76' into the plane perpendicular to an optical axis 22 of the microscope main objective system 20 on account of the position of the second observer 76' entered manually into the input device, for example in relation to the microscope unit 14 or in relation to the microscope main objective system 20. In this case, an orientation of the image 102, and hence the image of the object region 12 shown to the second observer 76', is only modified in the computer unit 98' if a new, modified position is entered into the input device of the orientation determining apparatus 96.

It should be noted that the maximum usable sensor area for the image 102 changes in accordance with the viewing angle β of the second observer 76' relating to the perpendicular to the distance line 94 of the optical axes 34, 34' of the first monoscopic imaging beam path 30 and of the second monoscopic imaging beam path 30'. In principle, all image data captured in an optical channel 32, 32' can be supplied to the second observer 76' in the case of the viewing angle β=0°. The second observer 76' only receives a section of these image data in the case of the viewing angle β=90° or β=270°.

It should also be noted that, in the system 10$^{(1)}$, a screen or any other display device for displaying two or three-dimensional image information may be provided in place of a head mounted display (HMD) as image producing device for the first observer 76 and the second observer 76'.

Figure 5A:
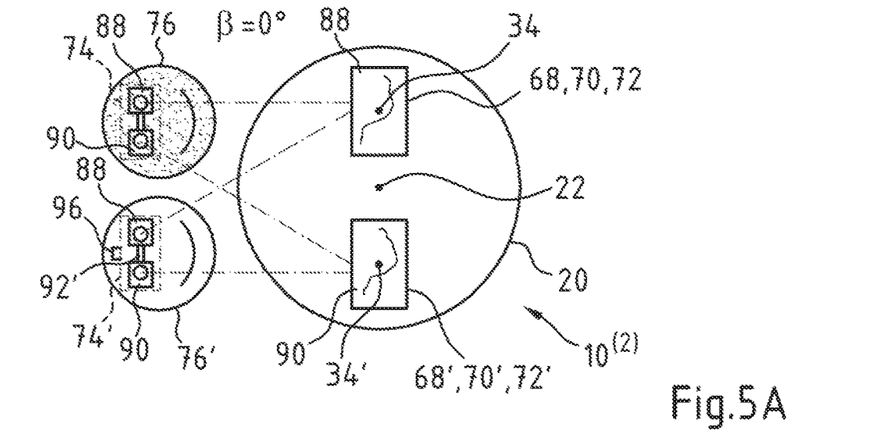
FIG. 5A shows a partial section of a second system for visualizing an object region with sensor areas of image sensors, and a first observer and a second observer.
Figure 5B:
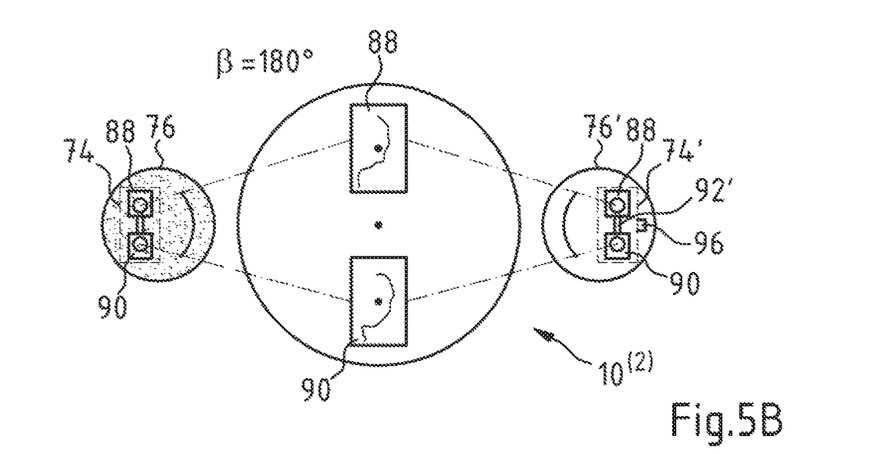
FIG. 5B and FIG. 5C show further partial sections of the second system.
Figure 5C:
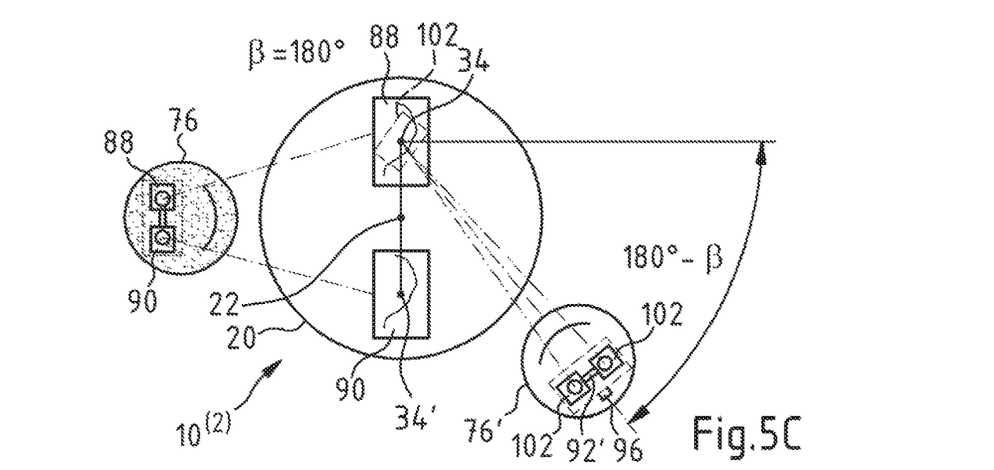

FIG. 5A, FIG. 5B, and FIG. 5C each show partial sections of a second system 10$^{(2)}$ for visualizing an object region with a first image producing device 74 for a first observer 76 and with a second image producing device 74' for a second observer 76'. To the extent that assemblies and elements in FIG. 5A, FIG. 5B, and FIG. 5C correspond to assemblies and elements from the figures described above, these are denoted by the same numbers as reference signs. In principle, the function and the design of the second system 10$^{(2)}$ for visualizing an object region correspond to the function and the design of the first system 10 for visualizing an object region 12.

Therefore, only the differences between the second system 10$^{(2)}$ for visualizing an object region 12 and the first system 10$^{(1)}$ for visualizing an object region 12 are explained below.

In the second system 10$^{(2)}$ for visualizing an object region, it is not only the first image producing device 74 but also the second image producing device 74' which facilitates the stereoscopic observation of the object region if the first observer 76 and the second observer 76' are positioned next to or opposite one another.

The stereoscopic partial images 88, 90 of the object region 12 captured by means of the image capturing device 16 are supplied to the first observer 76 by way of the computing unit 98. Here, in principle, the first observer 76 may exploit all of the image information.

The second observer 76' obtains a stereoscopic display image or a monoscopic display image from the image producing device 16 in accordance with their direction of view captured by means of the orientation determining apparatus 96. Here, the orientation determining apparatus 96 determines the orientation of the perpendicular projection of the connecting line 92' of the eyes 78', 80' of the second observer 76' into the plane perpendicular to an optical axis 22 of the microscope main objective system 20.

If the viewing angle β, as shown in FIG. 5A, is β=0°, i.e. if the viewing angle for the first observer 76 and the viewing angle for the second observer 76' are equal, the image producing device 74 and the image producing device 74' of the first and second observer 76, 76', respectively, visualize the same stereoscopic partial images 88, 90 captured by means of the image capturing device.

By contrast, if β=180° applies to the viewing angle, the image generating device 74' of the second observer 76' once again visualizes the same images 88, 90, which are stereoscopic partial images captured by means of the image capturing device. However, in this case, as shown in FIG. 5B, the images 88, 90 displayed by means of the image producing device 74' are interchanged in relation to the images 88, 90 displayed by means of the image producing device 74 of the observer 76 and shown digitally mirrored in the horizontal direction.

For viewing angles β which differ from the viewing angles β=0° and β=180°, for example for the setting of the second system 10$^{(2)}$, shown in FIG. 5C, for visualizing the object region 12, the image producing device 74' of the second observer 76' visualizes a monoscopic image 102 as an observation image of the object region 12.

In a modified embodiment of the second system 10$^{(2)}$, provision may be made for the image producing device 74' of the second observer 76' also to stereoscopically visualize the images 88, 90 captured by means of the image capturing device 16 as stereoscopic partial images, as described above, if the following applies for the deviation Δβ of the viewing angle β of the second observer 76' from the viewing angle β=0° or β=180°: −5°≤Δβ≤5° or −10°≤Δβ≤10° or −15°≤Δβ≤15° or −20°≤Δβ≤20° or −25°≤Δβ≤25° or −30°≤Δβ≤30°.

Figure 6A:
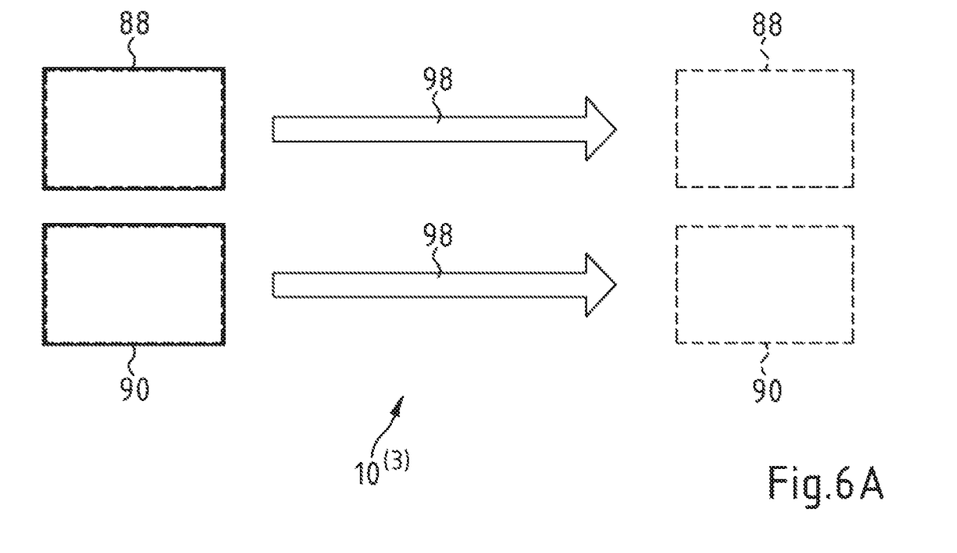
FIG. 6A and FIG. 6B show capturing and processing of image data in a third, alternative system for visualizing the object region with the first image producing device and with the second image producing device.
Figure 6B:
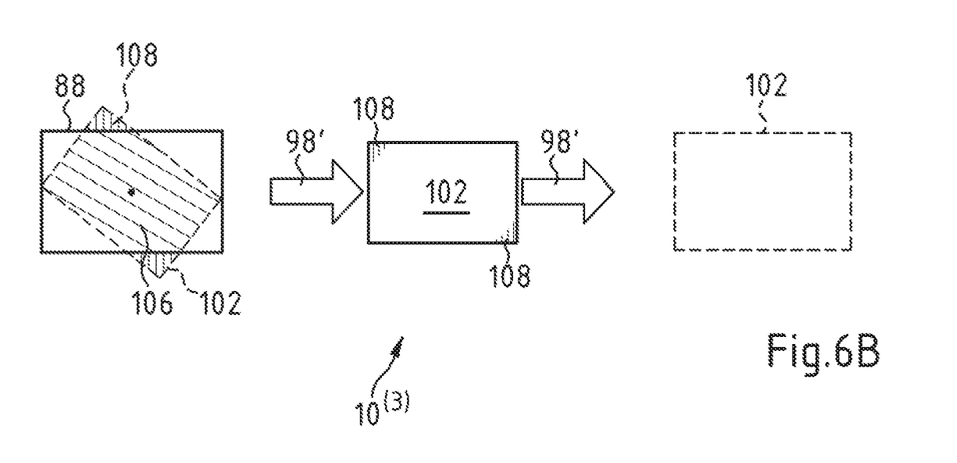

FIG. 6A and FIG. 6B show capturing and processing of image data in a further, third system for visualizing the object region 12 with the first image producing device 74 and with the second image producing device 74'.

To the extent that assemblies and elements in FIG. 6A and FIG. 6B correspond to assemblies and elements from the figures described above, these are denoted by the same numbers as reference signs. In principle, the function and the design of the third system $10^{(3)}$ for visualizing an object region correspond to the function and the design of the first system $10^{(1)}$ for visualizing an object region 12.

Therefore, only the differences between the third system $10^{(3)}$ for visualizing an object region 12 and the first system $10^{(1)}$ for visualizing an object region 12 are explained below.

In order to at least partly compensate the disadvantage of a restricted field-of-view and a reduced resolution for the second observer 76', the portion 106, read by digital windowing and rotation, in the image 88 captured by means of the image capturing device 16 as a stereoscopic partial image is comparatively larger in the third system $10^{(3)}$ for visualizing the object region 12. However, the side ratio of the portion 106 is selected in accordance with the side ratio of the captured image 88. This does accept that regions 108 which do not contain any image information occur at the edge of the image display in the image producing device 74' for the second observer screen. However, a digital post-magnification of the image supplied to the display unit 74', which is necessary so that the image displayed by means of the display unit 74' for visualizing the object region fills out the display unit 74', may be smaller in this case than in the above-described first and second systems $10^{(1)}$, $10^{(2)}$ for visualizing an object region.

Figure 7:
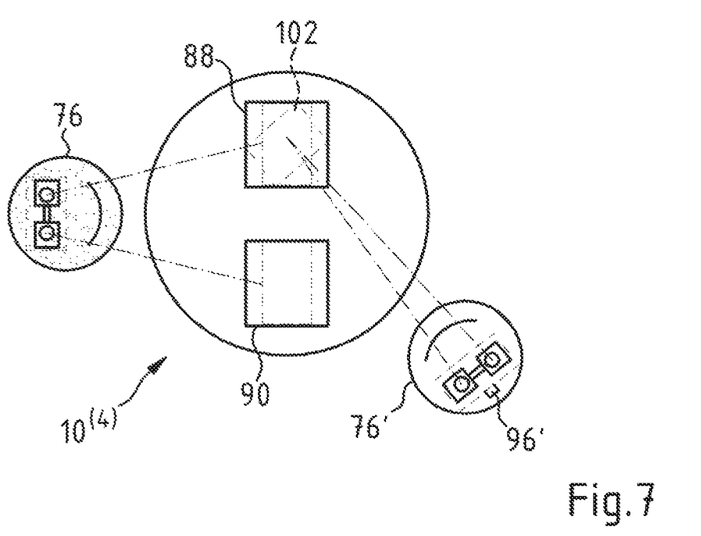
FIG. 7 shows a partial section of a fourth system for visualizing an object region with sensor areas of image sensors, and a first observer and a second observer.

FIG. 7 shows a partial section of a fourth system $10^{(4)}$ for visualizing an object region with sensor areas of image sensors, and a first observer 76 and a second observer 76'.

To the extent that assemblies and elements in FIG. 7 relate to assemblies and elements from the figures described above, these are denoted by the same numbers as reference signs. In principle, the function and the design of the fourth system $10^{(4)}$ for visualizing an object region 12 correspond to the function and the design of the first system 10 for visualizing an object region 12. Therefore, only the differences between the fourth system $10^{(4)}$ for visualizing an object region 12 and the first system 10 for visualizing an object region 12 are explained below.

The sensor areas 68, 68', 70, 70', 72, 72' of the image sensors 42, 42', 44, 44', 46, 46' are square in the fourth system $10^{(4)}$. The image 102 of the object region 12, which was digitally windowed in relation to the partial image 88 and which is shown to the second observer 76', is positioned centrally on the sensor area 68, 68', 70, 70', 72, 72' of an image sensor 42, 42', 44, 44', 46, 46' here. Here, it has a maximum possible extent.

In a development of the fourth system $10^{(4)}$, provision may be made for the side ratio of the sensor areas 68, 68', 70, 70', 72, 72' of the image sensors 42, 42', 44, 44', 46, 46' to deviate from the side ratio of the images which are displayable by means of the image producing device 74.

It should be noted that, in the fourth system $10^{(4)}$ for visualizing an object region, use may be made, in principle, of image sensors for capturing images which have non-square image formats, and image sensors with a quadratic sensor area for capturing quadratic images. It should be noted that, in principle, both the images 88, 90 for the stereoscopic visual impression of the first observer 76 and the image 102 for the second observer 76' may be obtained from the image 88, 90 captured by means of an image sensor in the required, as a rule rotated mono perspective by way of digital windowing. This offers the advantage of virtually the same resolution and virtually the same width of the field of view being displayable to both the first observer 76 and the second observer 76'.

Figure 8:
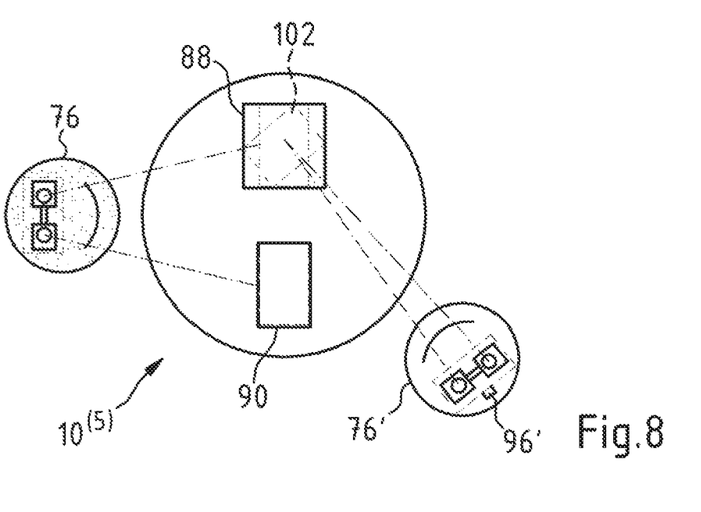
FIG. 8 shows a partial section of a fifth system for visualizing an object region with sensor areas of image sensors, and a first observer and a second observer.

FIG. 8 shows a partial section of a fifth system $10^{(5)}$ for visualizing an object region 12 with sensor areas of image sensors, and a first observer 76 and a second observer 76'. To the extent that assemblies and elements in FIG. 8 correspond to assemblies and elements from the figures described above, these are denoted by the same numbers as reference signs. In principle, the function and the design of the fifth system $10^{(5)}$ for visualizing an object region 12 correspond to the function and the design of the first system 10 for visualizing an object region 12. Therefore, only the differences between the fifth system $10^{(5)}$ for visualizing an object region 12 and the first system 10 for visualizing an object region 12 are explained below.

In the fifth system $10^{(5)}$ for visualizing an object region 12, the geometry of the sensor areas of the image sensors of the image capturing device differs for the two stereoscopic partial beam paths. The larger one of the two sensor areas may, in particular, be embodied in such a way that the resolution and the width of the field of view of the image depicted in the second image producing unit 74' are comparable to the resolution and the width of the field of view of the image depicted in the first image producing unit 74.

Figure 9:
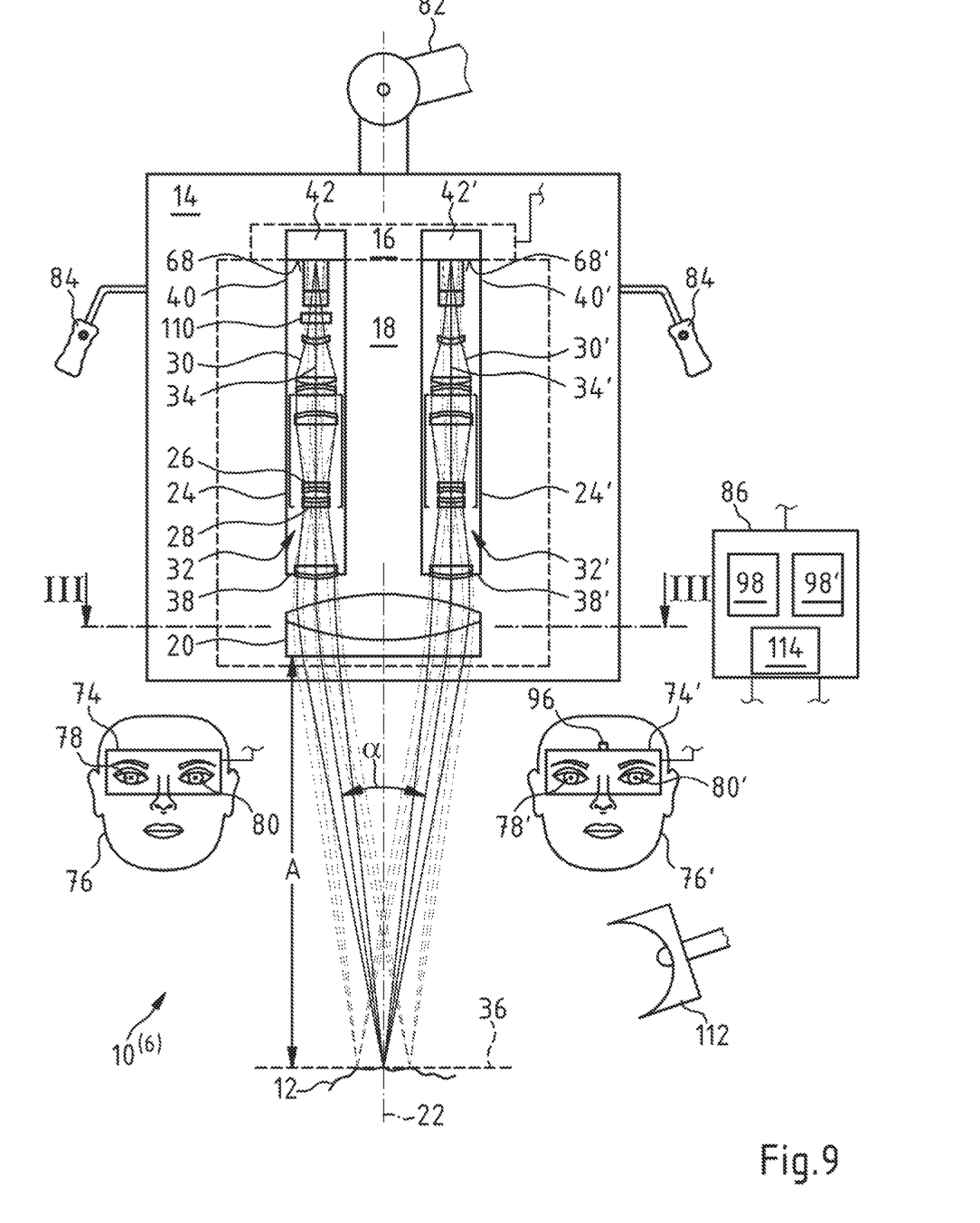
FIG. 9 shows a partial section of a sixth system for visualizing an object region with a first image producing device for a first observer and with a second image producing device for a second observer.

FIG. 9 shows a sixth system $10^{(6)}$ for visualizing an object region 12. To the extent that assemblies and elements in FIG. 9 and FIG. 10 relate to assemblies and elements from the figures described above, these are denoted by the same numbers as reference signs. In principle, the function and the design of the sixth system $10^{(6)}$ for visualizing an object region 12 correspond to the function and the design of the first system $10^{(1)}$ for visualizing an object region 12. Therefore, only the differences between the sixth system $10^{(6)}$ for visualizing an object region 12 and the first system 10 for visualizing an object region 12 are explained below.

The sixth system $10^{(6)}$ is designed for visualizing an object region 12 by means of fluorescence light. A filter 110 which only transmits the light of a spectral range in which a dye, excited to fluoresce by means of a light source 112, fluoresces in the object region 12 is arranged in the first optical channel 32.

Figure 10:
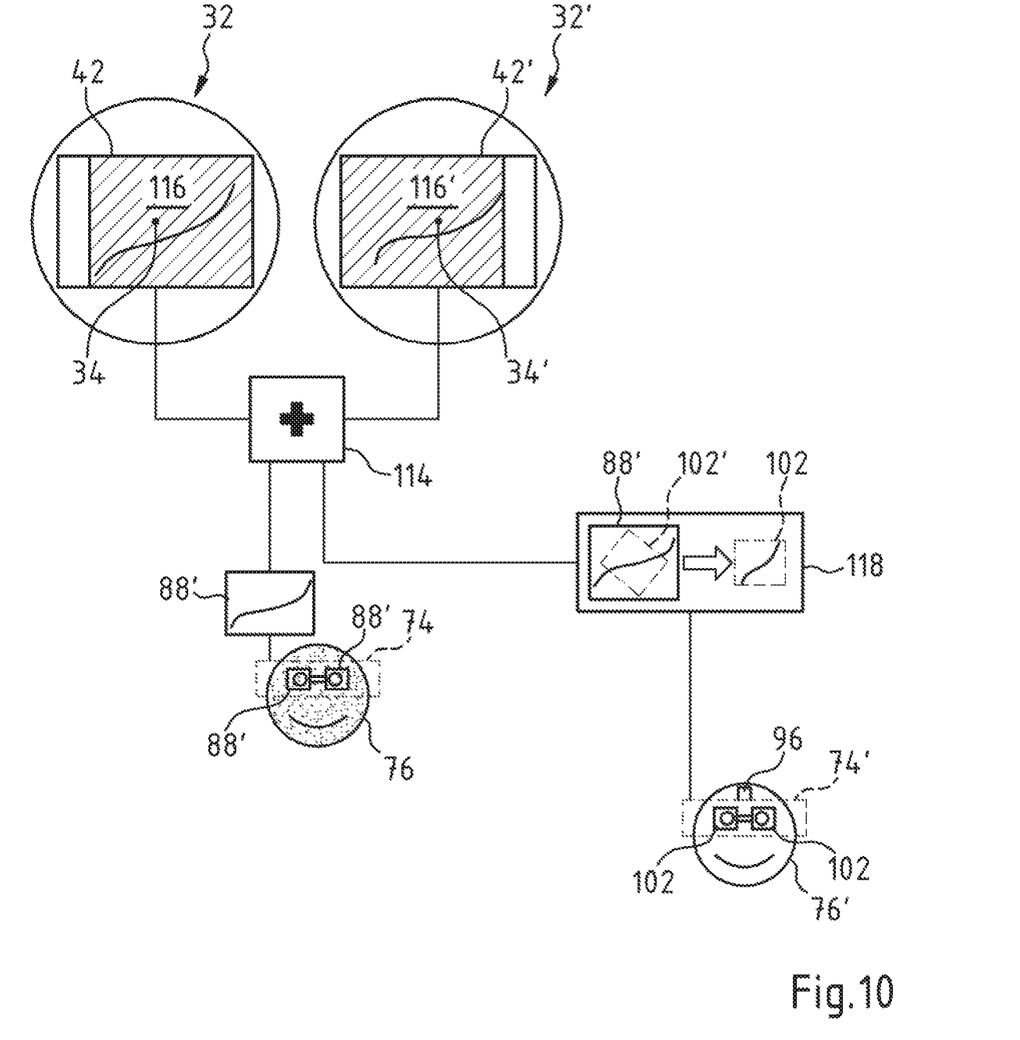
FIG. 10 shows image sensors for capturing light in a first optical channel and in a second optical channel of the sixth system of FIG. 9.

FIG. 10 shows image sensors 42, 42' for capturing light in the first optical channel 32 and in the second optical channel 32' of the sixth system $10^{(6)}$. In the sixth system $10^{(6)}$, fluorescence light is supplied to the image sensor 42 from the object region 12 and white light is supplied to the image sensor 42'. The computer unit of the system $10^{(6)}$ contains an image superposition stage 114. The image superposition stage 114 superposes the image regions 116, 116' of the sensor areas of the image sensors 42, 42' onto one another in a digital manner to form a monoscopic superposition image 88' of the object region 12.

The first image producing device 74 for the first observer 76 receives this monoscopic superposition image directly. A monoscopic superposition image 88', which has been processed in the image rotating stage 118, is supplied to the second image producing device 74'.

The image rotating stage 118 serves for the digitally rotated and windowed display of the image information of the superposition image 88' from the image superposition stage 114. To this end, the signal of the orientation determining apparatus 96 is processed in the image rotating stage 118 in order to visualize, for the second observer 76', an image 102 of the object region 12 in accordance with an orientation corresponding to the orientation of the perpendicular projection of the connecting line 92' of the eyes 78', 80' of the second observer 76' into the plane perpendicular to an optical axis 22 of the microscope main objective system 20. An image 102 with an image section 102' of the superposition image 88' is shown to the second observer 76' as an image of the object region 12. In relation to the superposition image 88', the displayed image 102 is digitally windowed and rotated. It has an image edge parallel to the perpendicular projection of the connecting line 92 of the eyes 78', 80' of the second observer (76') into the object region 12. The displayed image 102 contains image information from two optical channels with a differing spectral transmission. This measure allows visualization in the image of both structures in the object region 12 which e.g. are only visible under fluorescence light and of structures which are accessible to an observation when the object region 12 is illuminated with white light.

The invention also extends to a system for visualizing an object region in which features of the exemplary embodiments described above are combined.

In conclusion, the following should be registered: The invention relates to a system $10^{(1)}, 10^{(2)}, 10^{(3)}, 10^{(4)}, 10^{(5)}, 10^{(6)}$ for visualizing an object region 12, comprising an electronic image capturing device 16, comprising an optical assembly 18, which provides a first optical channel 32 for a first imaging beam path 30 imaging the object region 12 on a first sensor area 68, 70, 72 or a plurality of first sensor areas 68, 70, 72 of the image capturing device 16 and a second optical channel 32' for a second imaging beam path 30' imaging the object region 12 on a second sensor area 68' or plurality of second sensor areas 68', 70', 72' of the image capturing device 16 and which contains a microscope main objective system 20, through which the first imaging beam path 30 and the second imaging beam path 30' pass, comprising a first image producing device 74 for the visualization of the object region 12 for a first observer 76, to whom a first image 88 of the object region 12, captured on the first sensor area 68, 70, 72 or the plurality of first sensor areas 68, 70, 72, and a second image 90 of the object region 12, captured on the second sensor area 68' or the plurality of second sensor areas 68', 70', 72', are suppliable, and comprising a second image producing device 74' for visualizing the object region 12 for a second observer 76'. An image 102 of the object region 12, which contains the at least one image section of the first image 88 or of the second image 90, is suppliable to the second image producing device 74' for the visualization of the object region 12.

What is claimed:

1. An object region visualizing method, comprising:
capturing a first image of the object region and a second image of the object region in a first optical channel comprising a first imaging beam path and in a second optical channel comprising a second imaging beam path, respectively, and comprising optical axes which form a stereo angle in the object region,
displaying the object region to a first observer and a second observer,
determining an orientation of a perpendicular projection of a connecting line of eyes of the second observer in a plane perpendicular to an optical axis;
ascertaining an image section corresponding to the determined orientation of the perpendicular projection of the connecting line of the eyes of the second observer from the captured first image of the object region or from the captured second image of the object region, and
providing a monoscopic visualization of the object region using an image of the object region, that contains the image section of the first image or of the second image.

2. The object region visualizing method as claimed in claim 1, further comprising:
providing a stereoscopic visualization of the object region to the second observer with an image of the object region if the determined orientation of the perpendicular projection of the connecting line of the eyes of the second observer into the plane perpendicular to one of the optical axes is parallel to a plane spanned by the optical axis of the first imaging beam path and by the optical axis of the second imaging beam path or if the orientation is at an angle φ in relation to the plane spanned by the optical axis of the first imaging beam path and by the optical axis of the second imaging beam path, said angle φ satisfying a condition of being between −15° and 15°, and
providing the monoscopic visualization of the object region with the image section of the first image or of the second image, if the angle φ does not satisfy the condition.

3. A system for visualizing an object region, comprising:
an electronic image capturing device having:
a first sensor area or a plurality of first sensor areas, and
a second sensor area or a plurality of second sensor areas,
an optical assembly having:
a first optical channel configured for a first imaging beam path imaging the object region on the first sensor area or the plurality of first sensor areas of the image capturing device,
a second optical channel configured for a second imaging beam path imaging the object region on the second sensor area or the plurality of second sensor areas of the image capturing device, and
a microscope main objective system through which the first imaging beam path and the second imaging beam path pass,
a first image producing device configured to provide a first image of the object region, captured on the first sensor area or the plurality of first sensor areas, and a second image of the object region, captured on the second sensor area or the plurality of second sensor areas, to a first observer for a stereoscopic visualization of the object region,
a second image producing device configured to visualize the object region for a second observer,
an orientation determining apparatus configured to determine an orientation of a perpendicular projection of a connecting line of eyes of the second observer into a plane perpendicular to an optical axis of the microscope main objective system, and
a computing unit configured to ascertain an image section from the captured first image of the object region or from the captured second image of the object region in accordance with the determined orientation of the perpendicular projection of the connecting line of the eyes of the second observer,
wherein an image of the object region, which contains the image section of the first image or of the second image, is supplied to the second image producing device for a monoscopic visualization of the object region.

4. The system as claimed in claim 3, wherein:
the second image producing device is configured to provide to the second observer the captured first image and the captured second image for stereoscopic visualization of the object region if the orientation of the perpendicular projection of the connecting line of the eyes of the second observer into the plane perpendicular to the optical axis of the microscope main objective system is parallel to a plane spanned by an optical axis of the first imaging beam path and by an optical axis of the second imaging beam path on a side of the microscope main objective system facing away from the object region or if the orientation is at an angle φ in relation to the plane spanned by the optical axis of the first imaging beam path and by the optical axis of the second imaging beam path, said angle φ satisfying a condition of being between −15° and 15°, and
wherein the image of the object region, which contains the image section of the first image or of the second image is supplied to the second image producing device for the monoscopic visualization of the object region only if the angle φ does not satisfy the condition.

5. The system as claimed in claim 3, wherein the computing unit is configured to evaluate the orientation of the perpendicular projection of the connecting line of the eyes of the second observer into the plane perpendicular to the optical axis of the microscope main objective system and provide the captured first image and the captured second image to the second image producing device for the purposes of displaying a stereoscopic image of the object region if the orientation of the perpendicular projection of the connecting line of the eyes of the second observer into the plane perpendicular to the optical axis of the microscope main objective system is parallel to a plane spanned by an optical axis of the first imaging beam path and by an optical axis of the second imaging beam path on a side of the microscope main objective system facing away from the object region or if the orientation is at an angle φ in relation to the plane spanned by the optical axis of the first imaging beam path and by the optical axis of the second imaging beam path, said angle φ satisfying a condition of being between −15° and 15°.

6. The system as claimed in claim 3, wherein the computing unit is configured to extrapolate the image section of the first image or of the second image to the image supplied to the second image producing device for visualizing the object region.

7. The system as claimed in claim 6, wherein the computing unit is configured to convert the image section into a compatible image supplied to the second image producing device for visualizing the object region, said compatible image having portions lying outside of the first image or outside of the second image.

8. The system as claimed in claim 3, wherein at least one of the first sensor area or the plurality of first sensor areas, or the second sensor area or the plurality of second sensor areas, is rectangular.

9. The system as claimed in claim 3, wherein at least one of the first sensor area or the plurality of first sensor areas, or the second sensor area or the plurality of second sensor areas, is square.

10. A system for visualizing an object region, comprising:
an electronic image capturing device having:
a first sensor area or a plurality of first sensor areas, and
a second sensor area or a plurality of second sensor areas,
an optical assembly having
a first optical channel configured for a first imaging beam path imaging the object region on the first sensor area or the plurality of first sensor areas of the image capturing device, and
a second optical channel configured for a second imaging beam path imaging the object region on ft the second sensor area or the plurality of second sensor areas of the image capturing device, a spectral transmission of the second optical channel differing from a spectral transmission of the first optical channel and
a microscope main objective system through which the first imaging beam path and the second imaging beam path pass,
a first image producing device configured to provide a first image of the object region, captured on the first sensor area of the plurality of first sensors areas, and a second image of the object region, captured on the second sensor area of the plurality of second sensor areas to first observer for visualization of the object region,
a second image producing device configured to visualize the object region for a second observer,
a computer unit with an image superposition stage configured to superpose the first image and the second image to form a monoscopic superposition image of the object region,
an orientation determining apparatus configured to determine an orientation of a perpendicular projection of a connecting line of eyes of a second observer into a plane perpendicular to an optical axis of the microscope main objective system, and
an image rotating stage configured to digitally rotate and window the monoscopic superposition image, and to provide an image which has been digitally rotated and windowed in relation to the superposition image to the second image producing device as an image of the object region for a monoscopic visualization of the object region, said digitally rotated and windowed image having an image edge parallel to the perpendicular projection of the connecting line of the eyes of the second observer into the object region.

11. The system as claimed in claim 10, wherein the computer unit is connected to the second image producing device to provide the monoscopic superposition image to the second image producing device.

12. A non-transitory computer-readable storage device comprising instructions to cause an electronic device, upon execution of the instructions by one or more processors of the electronic device, to perform the method of claim 1, wherein the first image of the object region and the second image of the object region are fed to a computer unit as image data.

13. An object region visualizing method, comprising:
capturing a first image of the object region and a second image of the object region in a first optical channel comprising a first imaging beam path and in a second optical channel comprising a second imaging beam path, respectively, and comprising optical axes which form a stereo angle in the object region,
displaying the object region to a first observer and a second observer,
providing a spectral transmission of the second optical channel which differs from a spectral transmission of the first optical channel,
superposing the first image and the second image to form a monoscopic superposition image of the object region, determining an orientation of a perpendicular projection of a connecting line of eyes of the second observer into a plane perpendicular to an optical axis of a microscope main objective system, and providing a monoscopic visualization of the object region for the second observer by virtue of a image information of the superposition image being displayed as an image of the object region, said image being digitally windowed and rotated in relation to the superposition image and having an image edge parallel to the perpendicular projection of the connecting line of the eyes of the second observer into the object region.

14. A non-transitory computer-readable storage device comprising instructions to cause an electronic device, upon execution of the instructions by one or more processors of the electronic device, to perform the method of claim 13, wherein the first image of the object region and the second image of the object region are fed to a computer unit as image data.

* * * * *